(12) United States Patent
Tweedy et al.

(10) Patent No.: US 6,563,967 B2
(45) Date of Patent: May 13, 2003

(54) FIBER OPTIC DISPLACEMENT SENSOR

(75) Inventors: Michael J. Tweedy, Simi Valley, CA (US); Eric L. Goldner, Valencia, CA (US); Samuel N. Fersht, Studio City, CA (US); Shen-Hui L. Wu, Agoura Hills, CA (US)

(73) Assignee: Northrop Grumman Corporation, Woodland Hills, CA (US)

( * ) Notice: Subject to any disclaimer, the term of this patent is extended or adjusted under 35 U.S.C. 154(b) by 193 days.

(21) Appl. No.: 09/759,760

(22) Filed: Jan. 11, 2001

(65) Prior Publication Data

US 2001/0055438 A1 Dec. 27, 2001

Related U.S. Application Data

(60) Provisional application No. 60/178,334, filed on Jan. 27, 2000.

(51) Int. Cl.[7] .............................. G02B 6/00; G01C 19/72
(52) U.S. Cl. ...................... 385/12; 385/13; 250/227.19; 356/460
(58) Field of Search ................ 385/12, 13; 250/227.14, 250/227.19; 356/460, 465

(56) References Cited

U.S. PATENT DOCUMENTS

| 4,322,829 A | 3/1982 | Davis, Jr. et al. |
| 4,932,258 A | 6/1990 | Norling |
| 4,959,539 A | 9/1990 | Hofler et al. |
| 5,287,332 A | 2/1994 | Lea |
| 5,317,929 A | 6/1994 | Brown et al. |
| 5,363,342 A | 11/1994 | Layton et al. |
| 5,369,485 A | * 11/1994 | Hofler et al. .......... 250/227.19 |
| 5,883,308 A | 3/1999 | Fersht |
| 5,903,349 A | 5/1999 | Vohra et al. |

FOREIGN PATENT DOCUMENTS

| FR | 2 664 783 A | 1/1992 |
| GB | 2 312 503 A | 10/1997 |

* cited by examiner

Primary Examiner—Hemang Sanghavi
Assistant Examiner—Omar Rojas
(74) Attorney, Agent, or Firm—Lynn & Lynn

(57) ABSTRACT

A fiber optic displacement sensor includes a flexural disk assembly affixed to a mounting post that extends from a support base that is enclosed by a housing. Spiral wound optical fiber coils are mounted on opposite sides of the flexural disk with optical fiber leads extending from both the inner and outer diameters of the optical fiber coils and being optically coupled together to form an interferometer. An inertia ring connected to the periphery of the flexural disk has a plurality of peripheral slots therein for routing the optical fiber leads from the optical fiber coils to other components in the housing. The slots in the inertia ring are arranged to allow differing lengths of fiber to be wound circumferentially in different depth slots to accommodate mismatches in optical fiber lead lengths.

10 Claims, 5 Drawing Sheets

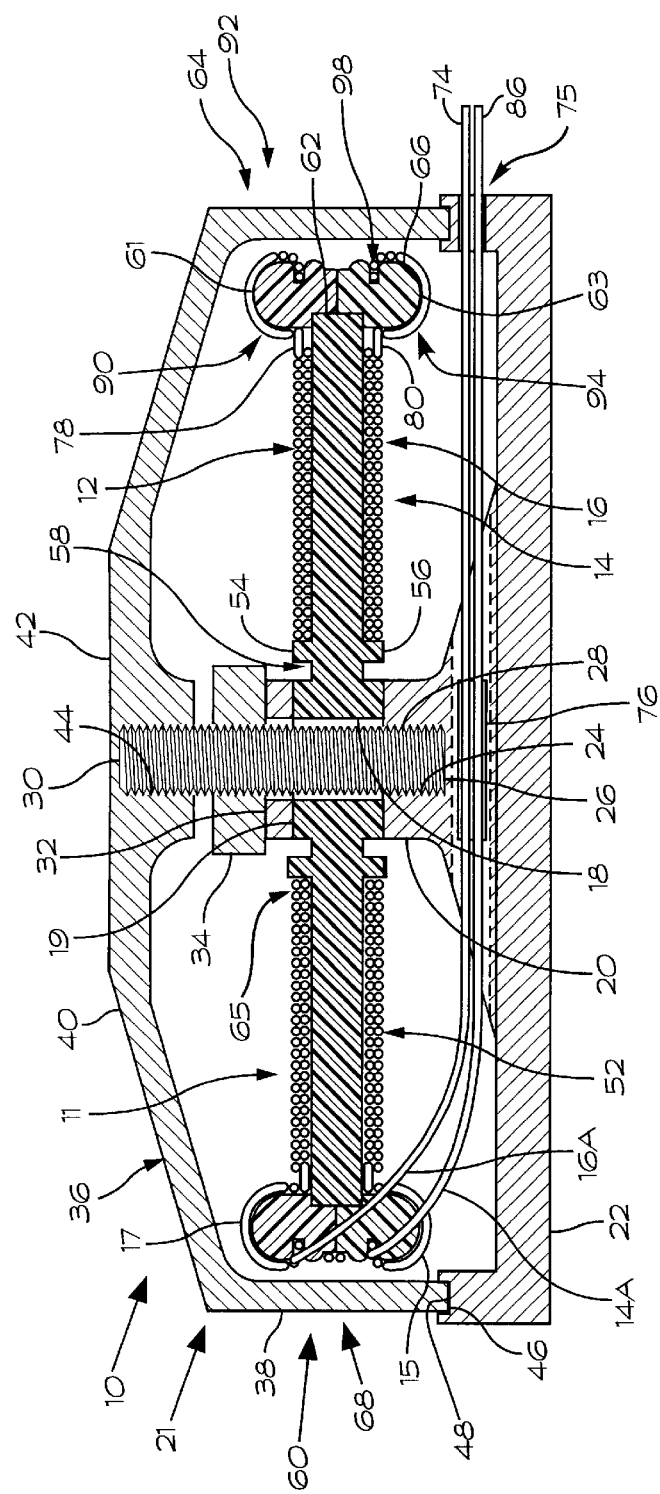
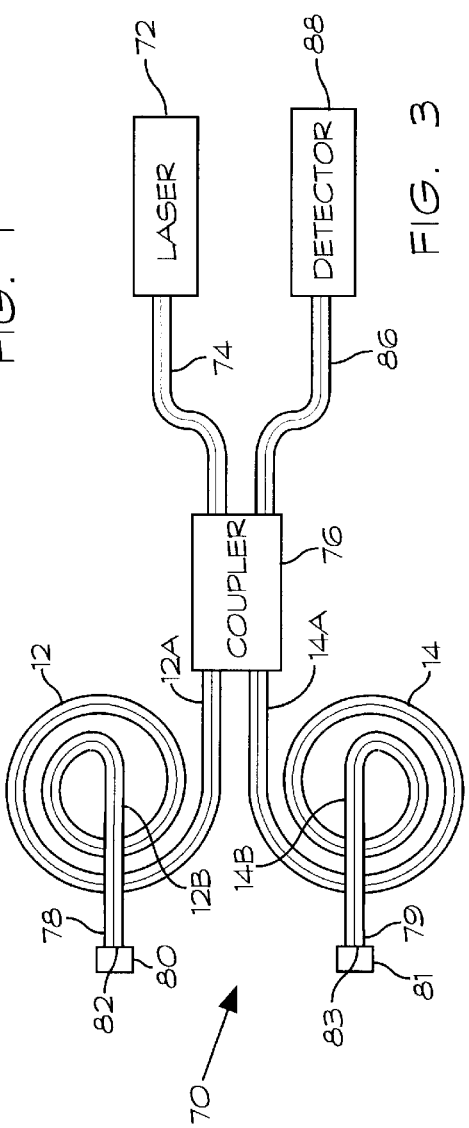
FIG. 1
FIG. 3

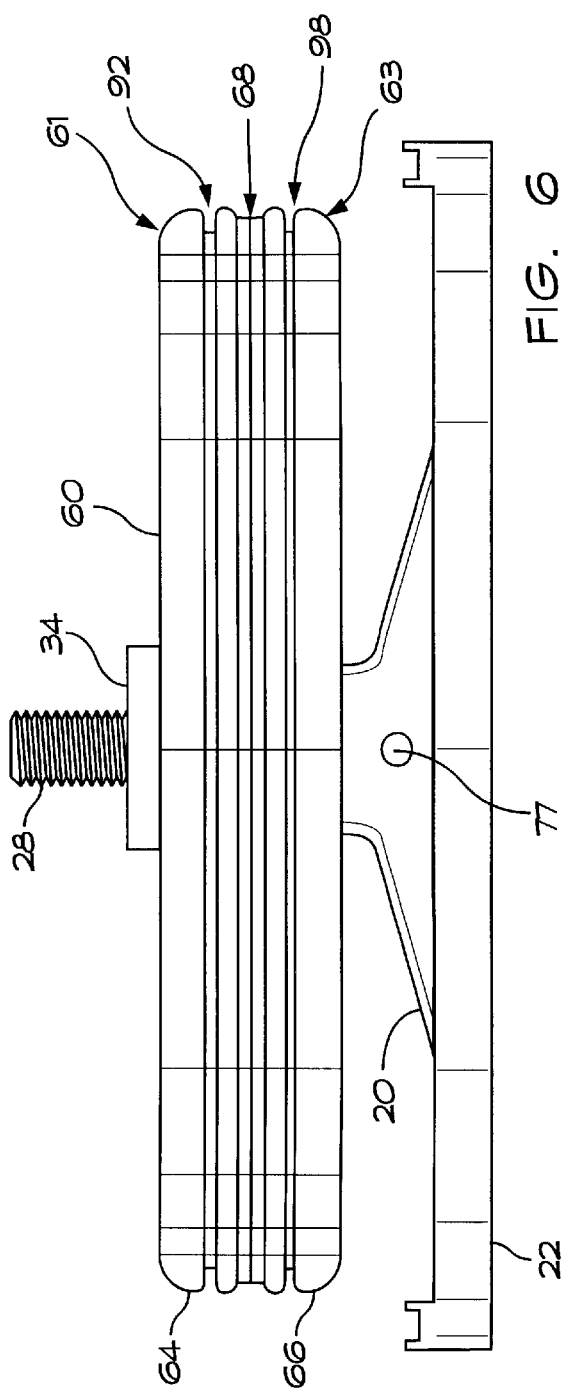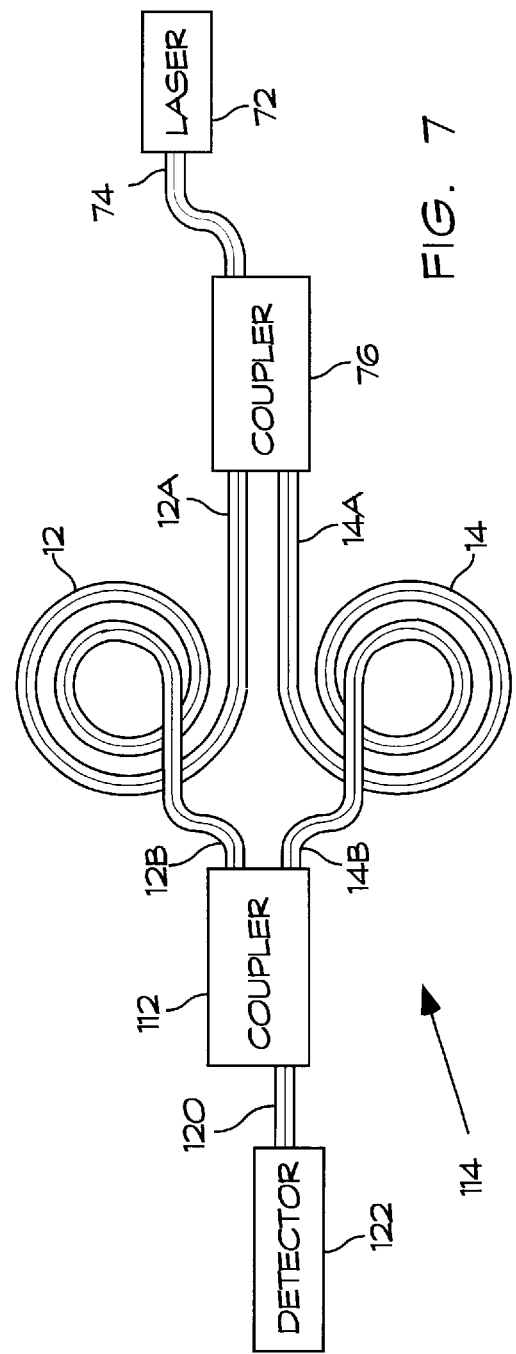

FIBER OPTIC DISPLACEMENT SENSOR

CROSS REFERENCE TO RELATED APPLICATION

Applicants claim the benefit of Provisional Application Ser. No. 60/178,334, filed Jan. 27, 2000 for Fiber Optic Displacement Sensor.

BACKGROUND OF THE INVENTION

This invention relates generally to displacement sensors. This invention relates particularly to a displacement sensor that includes a pair of multiple layer spiral-wound optical fiber coils on opposite sides of a flexural disk with the optical fiber coils being included in an interferometer. Still more particularly, this invention relates to a displacement sensor that includes a peripheral ring that has fiber routing slots around the edge of the flexural disk.

SUMMARY OF THE INVENTION

A fiber optic displacement sensor according to the present invention comprises a support base having a mounting post extending,therefrom. A flexural disk is connected to the mounting post, and a first spiral wound optical fiber coil is formed on the first side of the flexural disk. A second spiral wound optical fiber coil is formed on the second side of the flexural disk. Optical fiber leads extend from both the inner and outer diameters of the optical fiber coils. An optical coupler is arranged to couple optical signals between the optical fiber lead extending from each of the coils. The ends of the remaining leads are mirrored so that the combination of the optical fiber coils, leads and coupler forms a Michelson interferometer.

An inertia ring is connected to the periphery of the flexural disk. The inertia ring has a plurality of peripheral slots therein for routing the optical fiber leads from the first and second optical fiber coils to the optical coupler and to locations where the mirrored ends are secured.

The inertia ring preferably includes curved oppositely facing side edges with the plurality of peripheral slots being formed between the curved side edges. The curved side edges are formed such that the optical fiber leads may be spiral wound thereon between the first and second coils and the peripheral slots to prevent damage to the optical fiber leads from sharp bends.

The plurality of slots in the inertia ring are preferably arranged to allow differing lengths of fiber to be wound circumferentially, as required, in different depth slots to accommodate mismatches in optical fiber lead lengths. This allows both the fiber leads from the first and second fiber coils to ultimately exit the coil assembly together and take the same path to the coupler to provide improved common mode rejection of extraneous environmentally-induced phase shifts.

An appreciation of the objectives of the present invention and a more complete understanding of its structure and method of operation may be had by studying the following description of the preferred embodiment and by referring to the accompanying drawings.

BRIEF DESCRIPTION OF THE DRAWINGS

FIG. 1 is a cross sectional view of a fiber optic displacement sensor according to the present invention in which a pair of spiral wound optical fiber coils are formed on a flexural disk that is mounted to a base that is connected to a cover;

FIG. 3 is a block diagram of the sensor which illustrates a Michelson interferometer that includes a pair of coils of optical fiber of the type shown in FIGS. 1 and 2;

FIG. 6 is an elevation view of the apparatus of FIG. 1 with the cover removed;

FIG. 7 schematically illustrates an alternate embodiment that uses a Mach-Zehnder interferometer formed to include a pair of coils of optical fiber of the type shown in FIGS. 1 and 2;

DETAILED DESCRIPTION OF THE PREFERRED EMBODIMENT OF THE INVENTION

Figure 8:
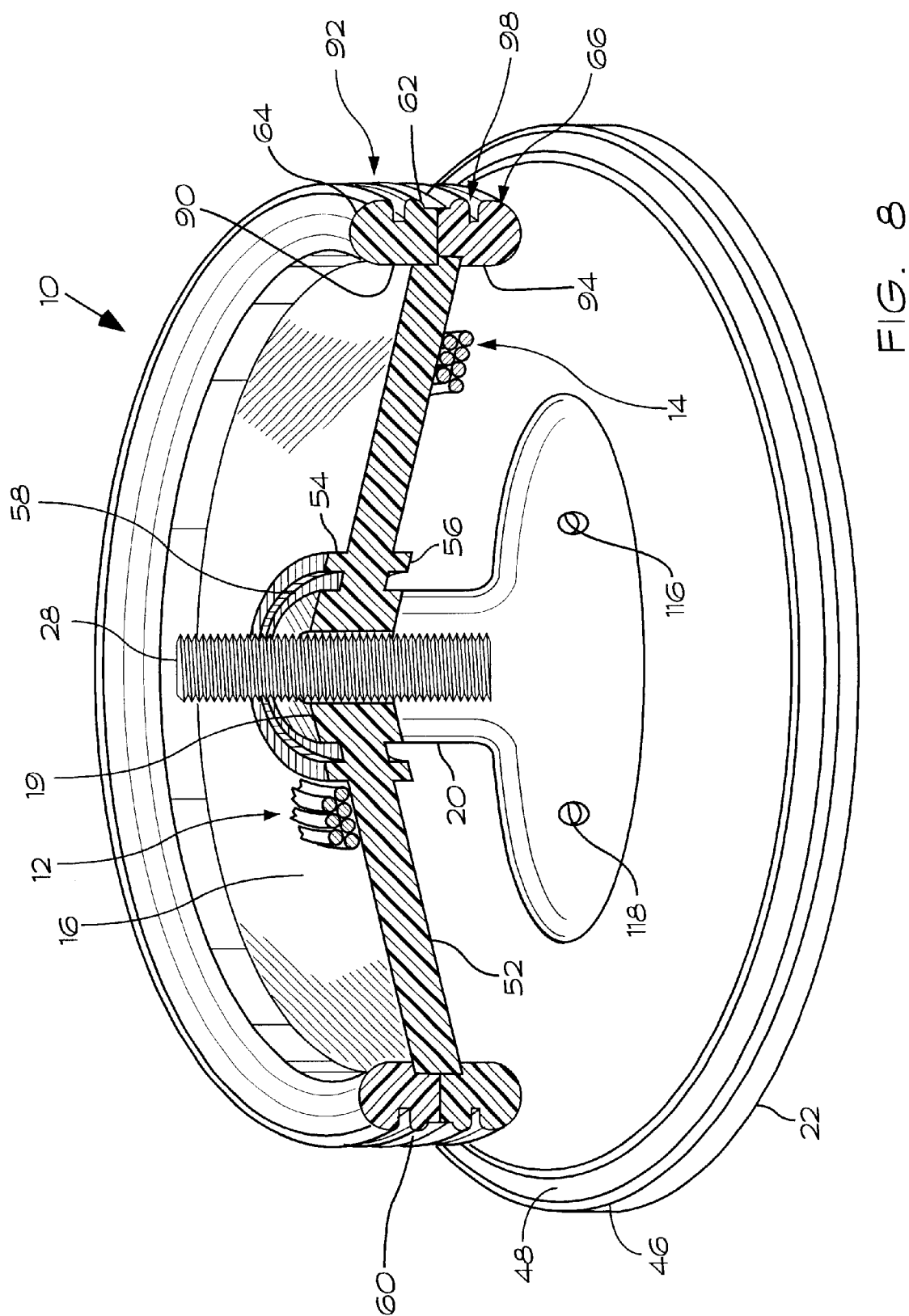
FIG. 8 is a cut away perspective view of a fiber optic displacement sensor according to the present invention.

As shown in FIGS. 1 and 8, a displacement sensor 10 according to the present invention includes an upper coil 12 of optical fiber and a lower coil 14 that is also formed of optical fiber. The upper and lower coils 12 and 14, respectively, are formed on opposite sides of a flexural disk 16 that is preferably formed of a compliant material such as polycarbonate. Other materials such as aluminum may be used for the flexural disk, depending on the operational spectral range of the sensor. The flexural disk 16, upper and lower coils 12 and 14, and an inertial mass 60 comprise a flexural disk assembly 11 that is the primary transducer for the displacement sensor 10. The flexural disk 16 has a central passage 18. An inner portion of the flexural disk 16 adjacent the central passage comprises a mounting hub 19 that allows the disk 16 to be mounted on a mounting post 20 as explained subsequently.

The displacement sensor 10 includes a housing 21 that includes a base 22. The mounting post 20 extends from a central portion of the base 22. A threaded passage 24 in the mounting post 20 is arranged to receive a first end 26 of a bolt 28. A second end 30 of the bolt 28 extends away from the mounting post 20 through the passage 18 in the disk 16. A washer 32 is located along the bolt 28 so that the disk 16 is between the upper end of the mounting post 20 and the washer 32. A nut 34 is threaded onto the bolt 28 to tightly secure the washer 32 and the hub 19 to the mounting post 20.

The second end 30 of the bolt 28 extends through the nut 34. The housing 21 also includes a cover 36 that has a generally cylindrical side wall 38 and a frustoconical (or domed) top 40. A central portion 42 of the top 40 has a threaded passage 44 therein arranged to be mounted on the end 30 of the bolt 28. The cover 36 is formed so that engaging the passage 44 and the bolt 28 causes a lower edge 46 of the cover 36 to become engaged in a circular groove 48 formed in the base 22. The cover 36 is sealed to the base 22 with an adhesive bond so that the housing is water-tight.

Referring to FIGS. 1, 2, 4 and 8, the central mounting hub 19 has a thickness greater than the portion 52 of the disk 16 where the optical fiber coils 12 and 14 are located. An upper cylindrical projection 54 extends from the disk 16. The projection 54 is spaced apart from the hub 19. The space between the hub 19 and the projection 54 has a thickness that is less than the thickness the hub 19 so that there is a generally cylindrical cavity between the hub 19 and the projection 54. A cylindrical projection 56 that is preferably substantially identical to the projection 54 extends from the lower side of the disk 16. The portion of the disk 16 between the projections 54 and 56 and the hub 19 defines a hinge 58 where the disk 16 may flex in response to movement of the mounting post 20 and bolt 28 in a direction having a component perpendicular to the plane of the disk 16.

Still referring to FIGS. 1, 2, 4, 6 and 8, an inertial mass 60 is attached to an outer edge 62 of the disk 16 for the purpose of lowering the natural frequency of the flexural disk assembly 11 and maximizing the sensitivity of the sensor 10 to axial acceleration. The mass 60 is conveniently formed of an upper ring 64 and a lower ring 66. When assembled together, the upper and lower rings 64 and 66 define a shallow slot 68 that extends around the inertial mass 60. The upper and lower rings 64 and 66, respectively, preferably are connected together by a high bulk modulus structural adhesive so that they are retained securely upon the edge 62 of the disk 16.

As shown schematically in FIG. 3, the optical fiber coils 12 and 14 are included as the two legs of an interferometer 70. FIG. 3 shows a well-known Michelson interferometer configuration, but the invention can be practiced using a Mach-Zehnder interferometer as shown in FIG. 7. In the subsequent explanation of the invention it is convenient to refer to the coil 12 as having an input lead 12A and an output lead 12B. Likewise, the coil 14 has an input lead 14A and an output lead 14B. It should be noted that splices ordinarily will be required to assemble the Michelson inteiferometer. Such splices are not shown because they are well within the skill of one or ordinary skill in the art.

A remotely located laser 72 provides an optical signal to an optical fiber lead 74, which guides the optical signal to a fiber optic coupler 76. The coupler 76 may be any suitable coupler structure that is well-known in the art. The coupler output signals are inputted to the leads 12A and 14A to supply optical signals to each of the optical fiber coils 12 and 14. Motion of the housing 21 induced by an acoustic wave causes a flexing of the flexural disk assembly 11 in a direction perpendicular to its plane. This flexing causes equal and opposite strains in each of the fiber disks 12 and 14. The strains cause equal and opposite changes in the optical path lengths of each of the fibers and hence changes the phase of light traveling within each coil 12 and 14. Optical signals are outputted from the optical fibers 12 and 14 to optical fibers 78 and 79, respectively, via the leads 12B and 14B, respectively. The optical fibers 78 and 79 have mirrors 80 and 81, respectively, formed on their ends 82 and 83, respectively, which doubles the change in optical path length (and hence double the total optical phase difference that occurs) in each of the fiber coils 12 and 14. The optical signals reflect from the mirrors 80 and 81 and then propagate back to the coupler 76. The signals combine in the coupler 76 to produce an interference pattern. The coupler 76 couples the interferometer output into an optical fiber lead 86. A remotely located photodetector 88 receives the interferometer output and produces an electrical signal that may be processed to determine the amplitude and frequency of the acoustic wave that caused the optical path lengths to change.

The optical fiber coils 12 and 14 may be formed directly on their respective surfaces of the flexural disk 16. In this case, the projections 54 and 56 function as winding hubs for the optical fiber coils 12 and 14, respectively. Alternatively, the optical fiber coils 12 and 14 may be pre-formed and then adhesively bonded to the flexural disk 16.

Figure 2:
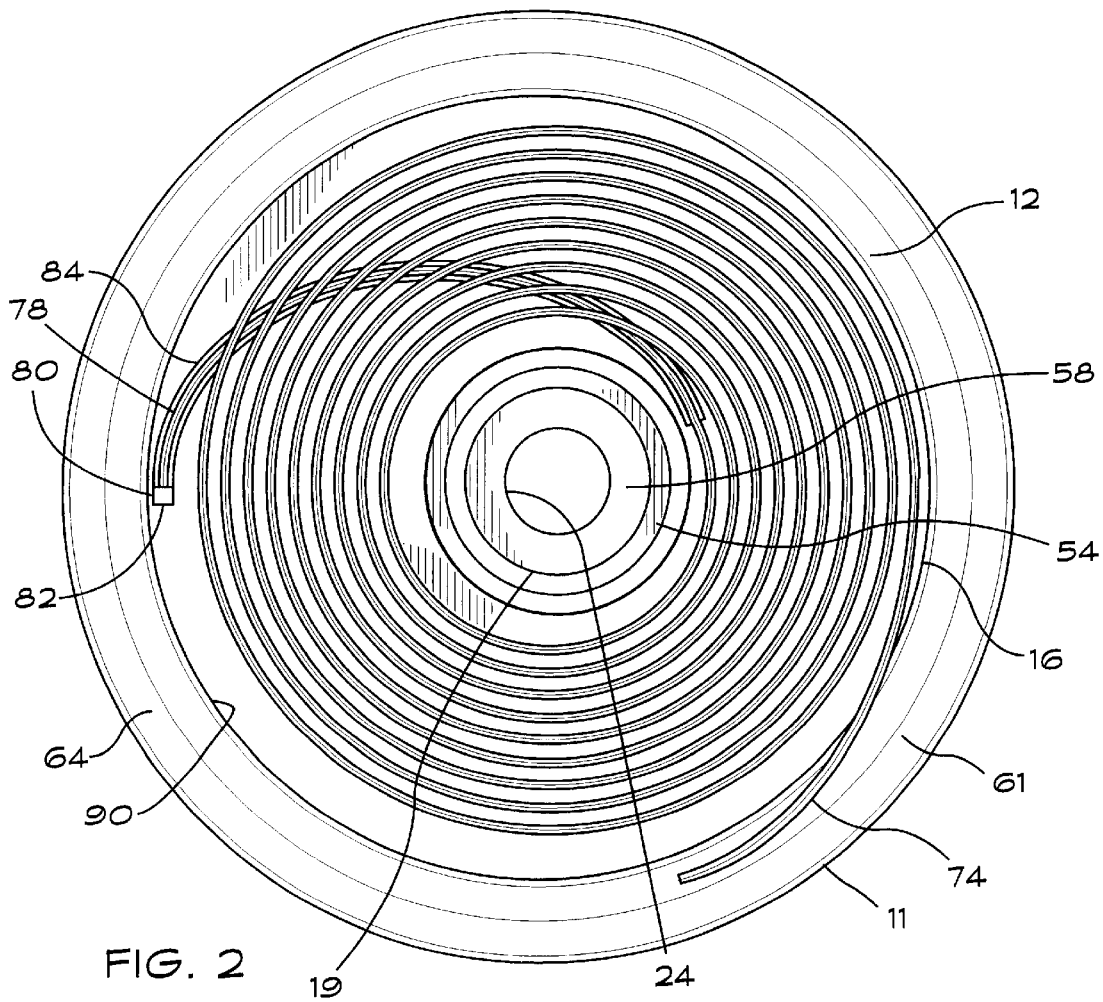
FIG. 2 is a top plan view of the flexural disk assembly showing a coil of optical fiber that may be included in the apparatus of FIG. 1.

Referring to FIGS. 1 and 2, before winding is started, the end 82 of the optical fiber 78 is positioned within a spiral slot 84 contained in the flexural disk 16. Once winding is completed and thermally cured in place, the end 82 of the optical fiber 78 and the mirrored reflector 80 are wound within the space remaining between the outer diameter of the fiber coil 12 and an inner edge 90 of the upper ring 64 and secured in place by adhesive bonding.

The end portion 83 of the optical fiber 79 is similarly positioned within a spiral slot (not shown) contained on the opposite side of flexural disk 16 before winding is again initiated. Once winding is completed and thermally cured in place, the end portion 83 and the mirrored reflector 81 are likewise wound within the space remaining between the outer diameter of coiled fiber 14 and inner edge 94 of the lower ring 66 and also secured in place by adhesive bonding.

Referring to FIGS. 1, 4, 6, and 8, the inertial mass 60 has curved upper and lower edges 61 and 63, respectively. A portion 17 of the opposite end of the optical fiber 12 is wound on the inner edge 90 and passed over the curved portion 61 and then wound around the ring 64 in the slot 92 a required number of turns before transitioning to the larger circumferential slot 68. An end portion 15 of the optical fiber 14 is similarly wound on the inner edge 94 of the ring 66, passed over the curved portion 63 and wrapped around the ring 60 in the slot 98 a required number of turns as well before transitioning to the larger circumferential slot 68. When the lengths of both optical fibers 12 and 14 enter the slot 68, they are equalized in length in the distance remaining to reach the coupler 76. The number of turns that both optical fibers 12 and 14 wrap in the common slot 68 is merely that which is required to take up the slack of excess fiber length before transitioning out of the slot 68 directly to the coupler 76. The fiber leads 74 and 86 extend from the coupler 76 through a fiber exit passage 75 in the sidewall 38 of the cover 36. The passage 75 is then sealed with a suitable sealant to prevent fluid from entering the interior of the region defined by the cover 36 and base 22.

Figure 4:
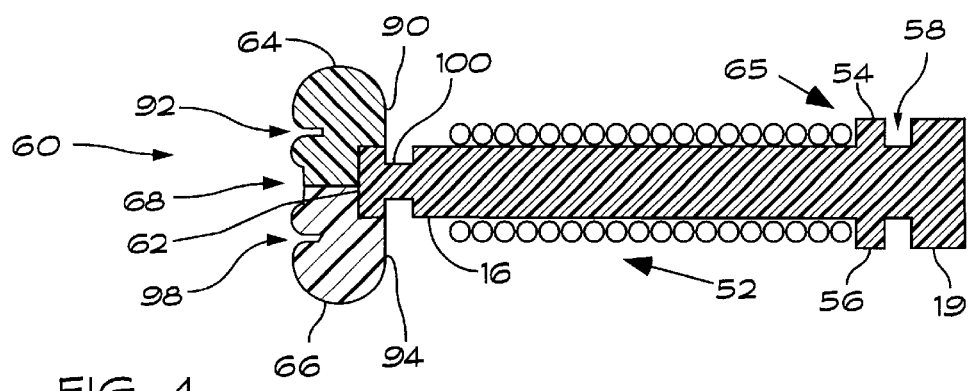
FIG. 4 is a partial cross sectional view showing a second embodiment of a flexural disk that may be included in the fiber optic displacement sensor according to the present invention.

FIG. 4 shows an alternate embodiment of the invention where a second hinge 100 is formed near the outer edge 62 of the flexural disk 16. The hinge 100 helps reduce the resonant frequency and increase the compliance of the disk 16 which increases the scale factor for sensing applications that require lower input frequency acceleration inputs and higher sensor gain.

Figure 5:
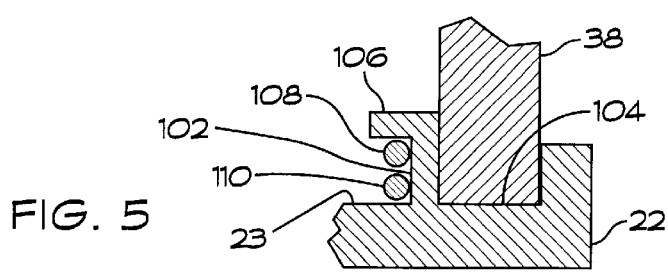
FIG. 5 is a partial cross sectional view illustrating a second embodiment of a connection between the base and the cover.

FIG. 5 shows a structure for securing the cover 36 to the base 22. The sidewall 38 extends into a groove 104 in the base 22. An L-shaped projection 106 extends from the base 22 adjacent the bottom inner portion of the sidewall 38. The projection 106 and an upper surface 23 of the base 22 define an inward facing circular groove 102. The optical fiber leads 108 and 110 may be coiled inside the housing and retained in the groove 102 created by the projection 106 and the surface 23. The capability of retaining the fibers inside the coil is convenient for dressing excess fiber lead lengths.

The entire sensor 10 is preferably formed to be neutrally buoyant so that it will move in response to an incident acoustic wave. The displacement sensor 10 is designed to have the resonant frequency (about 100 Hz) of the flexural disk assembly 11 occur below the acoustic frequency band of interest. In this mode, the sensor 10 acts as a displacement device that outputs an intensity-modulated optical signal proportional to the amplitude of the acoustic input. In practice, the entire sensor assembly 10 is often encapsulated in a soft, compliant acoustically transmissible medium such as polyurethane.

When subjected to acoustic energy, the neutrally-buoyant encapsulated sensor assembly 10 moves in concert with the acoustic wave. Because of the inertia of the heavy tungsten ring 60, the outer edge 62 of the flex disk assembly 11 remains inertially stable in space whereas the central mounting post 20 moves as one mass with the housing 21. The hinge 58 formed in the flexural disk 16 provides a degree of freedom that permits deflection of the an edge 65 of the flexural disk 16 to occur. A similar degree of freedom is generated at the outer edge 62 of the flexural disk 16 by virtue of a narrow clamping surface surrounded by a compliant bonding adhesive applied to the mating surfaces of the inertially stable tungsten ring 60. The optional hinge 100 adds additional compliance to the tungsten ring 60 to further minimize any tendency to rotationally twist the inertially stable ring.

The relative axial motion between the inner and outer portions 65 and 62, respectively, of the flexural disk 16 induces an accompanying strain in the integrally bonded upper and lower fiber optic coils 12 and 14, accordingly. The relative strain is induced in opposite sense to each coil so that whenever the upper coil 12 undergoes compression, the lower coil 14 undergoes tension and vice-versa. When laser light is transmitted through both upper and lower fiber optic coils 12 and 14, respectively, from the output of the 2×2 optical coupler 76, the effect of the induced strain changes the relative path lengths (and hence, phase) of the laser light that enters the interferometer.

Light that is reflected from the mirrored ends 82 and 83 of the optical fiber coils 12 and 14, respectively, also undergoes additional phase shift as it transits the coils a second time. The total differential phase is coherently recombined at the coupler 76 of the Michelson interferometer. This light, now containing the acoustic information, is split off to the photodetector 88 at a remote processing system for electronic signal processing such as demodulation, filtering, etc.

This sensor 10 combines elements of low cost machined components with commercial off-the-shelf common hardware and low cost optical fiber to create an inexpensive device. Typical applications for this device include underwater phased-array passive sonar sensing and seismic surveying.

The displacement sensor 10 according to the present invention preferably employs the Michelson interferometer approach for acoustic sensing of wide band audio frequencies in the frequency range between 150 Hz and 10 KHz. Addition of a second coupler 112 instead of the mirrors 78 and 80 to couple light between the fiber coils 12 and 14 forms a Mach-Zehnder interferometer 114, which could also be used in practicing the present invention.

Figure 9:
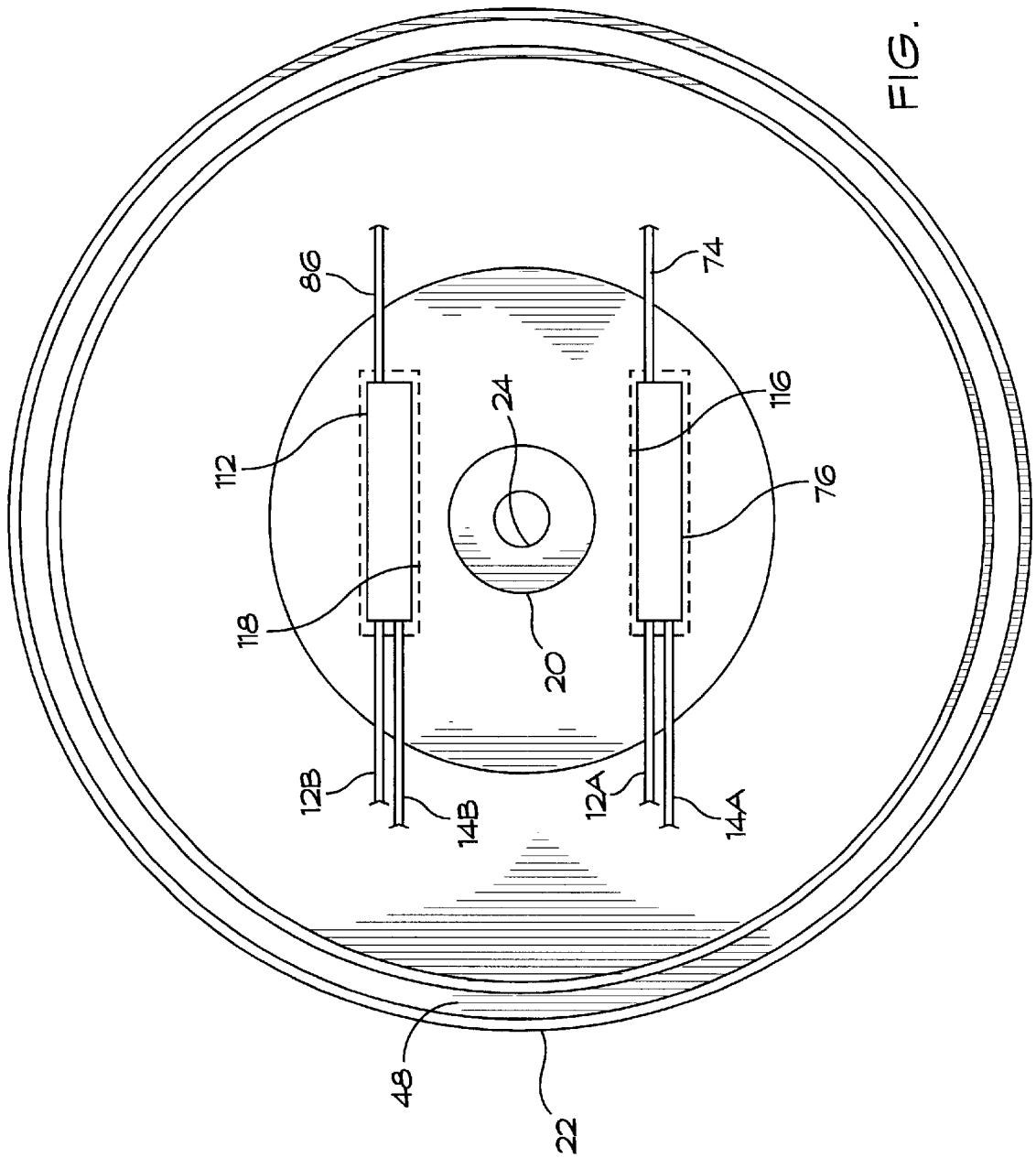
FIG. 9 is a plan view showing a pair of passages through a base for mounting optical couplers therein.

In the Mach-Zehnder interferometer embodiment shown in FIGS. 8 and 9, the couplers 76 and 112 are preferably located in a pair of passages 116 and 118 through the base 22. The passages 116 and 118 preferably are arranged symmetrically with respect to the vertical centerline of the base 22. In the Mach-Zehnder configuration, the coupler 76 provides the laser light to the leads 12A and 14A to divide the light from the laser 72 equally between the coils 12 and 14, respectively. The coupler 112 coherently recombines light received from the coils 12 and 14 via the leads 12B and 14B, respectively, to produce an interference pattern. The coupler 112 outputs the combined optical signals to an optical fiber 120 that guides the optical output to a detector 122.

While the Michelson interferometer mechanization is common for fiber optic sensors of this type, this particular design employs a number of innovative features that solves some of the more common problems inherent in this family of sensors. For example, previous displacement sensors have difficulties associated with the large inertia mass 60 placed outboard of the flexural disk 16, which is used to adjust the resonant frequency well below the lowest frequency of interest and thus improve the flatness of the frequency response.

A conflict occurs when trying to route the fiber from the coils 12 and 14 past the mass 60 to connect with the optical coupler 76. Tunnel slots cut into the flexural disk 16 or the inertia ring 60 to allow the fiber to pass through to the outside are not practical because the fibers need to exit tangentially from the flexural disk 16 rather than radially in order not to violate the glass fiber's minimum bend radius. The present invention overcomes this problem by incorporating within inertia ring 60 semi-circular top and bottom edges 61 and 63, which allow the fiber to spiral up the inner wall, over the rounded top, and spiral down the outer diameter of the ring without encountering any sharp angles, bends, edges or discontinuities. The upper and lower rings 64 and 66 and their corresponding coils 12 and 14 are mirror images, which allows both fibers 12 and 14 to come together in the center slot 68 and exit directly (and be tacked together if necessary) to the optical coupler 76 to maximize common mode rejection of extraneous phase changes due to environmental perturbations, especially temperature induced strain.

A second problem occurs when splices are made to the optical coupler 76. The splices to the coupler do not yield 100%. Multiple attempts are sometimes required to ensure very little excess transmission loss occurs across the fused connection and that the joint is mechanically sound. As a result, one lead of one of the coils 12 and 14 is invariably shorter than intended. Standard practice has been to simply dress and epoxy tack the longer leads the best way possible along a convoluted path on the mounting base 22 until the intentional length mismatch entering the coupler 76 has been equalized. Erroneous phase changes can occur between the two coil lengths 12A and 14A due to slight differences in temperature, shock, or vibration exposures to each fiber that are not self-canceling as a result of different routings of the two leads. The slots 92 and 98 eliminate this problem by allowing placement of the shorter fiber coil length during the excess fiber take-up that occurs after placing the flex disk assembly onto the mounting post 20. During this fiber take-up process, once the shorter fiber is wound the required number of turns (or partial turns) into the slot 92 or 98, the fiber is then shifted over to the wider slot 68 to complete the wind along with its fiber mate from the opposite coil. This technique automatically equalizes the fiber length without incurring the loss in common mode rejection of extraneous environmentally-induced phase shifts.

Another problem that occurs with prior art devices is interference caused by structural resonances that occur at frequencies within the acoustic frequency pass band. This generally occurs with larger displacement sensors whose flat-topped housings act as a flat diaphragm and resonate at a lower than desired frequency. The effect would potentially interfere with the acoustics signals of the same frequency and directly impact the flat frequency response that is required by specification for these sensors, particularly in a multi-sensor array application.

To mitigate this problem, the cover 36 of the sensor according to the present invention is specially sloped to create a conical shell that stiffens the housing structure when it is securely connected to the bolt 28 via the centrally-threaded hole 44. The resulting high stiffness can shift the natural cover resonance outside the pass band of interest so as not to impact the flatness of the frequency response over the desired frequency range.

The structures and methods disclosed herein illustrate the principles of the present invention. The invention may be embodied in other specific forms without departing from its spirit or essential characteristics. The described embodiments are to be considered in all respects as exemplary and illustrative rather than restrictive. Therefore, the appended claims rather than the foregoing description define the scope of the invention. All modifications to the embodiments described herein that come within the meaning and range of equivalence of the claims are embraced within the scope of the invention.

What is claimed is:

1. A fiber optic displacement sensor, comprising:
   a support base;
   a mounting post extending from the base;
   a flexural disk connected to the mounting post, the flexural disk having a first side and a second side;
   a first spiral wound optical fiber coil formed on the first side of the flexural disk, the first coil having a first inner optical fiber lead and a first outer optical fiber lead extending therefrom;
   a second spiral wound optical fiber coil formed on the second side of the flexural disk, the second coil having a second inner optical fiber lead and a second outer optical fiber lead extending therefrom;
   an optical coupler arranged to couple optical signals between the first and second optical fiber coils to form an interferometer; and
   an inertia ring connected to the periphery of the flexural disk, the inertia ring having a plurality of peripheral slots therein for routing the first and second optical fiber leads from the first and second optical fiber coils, respectively, to the optical coupler, the inertia ring including curved oppositely facing end edges with the plurality of peripheral slots being formed between the curved side edges, the curved end edges being formed such that the optical fiber leads may be spiral wound thereon between the first and second coils and the peripheral slots to prevent damage to the optical fiber leads from sharp bends.

2. A fiber optic displacement sensor, comprising:
   a support base;
   a mounting post extending from the base;
   a flexural disk connected to the mounting post, the flexural disk having a first side and a second side;
   a first spiral wound optical fiber coil formed on the first side of the flexural disk, the first coil baying a first inner optical fiber lead and a first outer optical fiber lead extending therefrom;
   a second spiral wound optical fiber coil formed on the second side of the flexural disk, the second coil having a second inner optical fiber lead and a second outer optical fiber lead extending therefrom;
   an optical coupler arranged to couple optical signals between the first and second optical fiber coils to form an interferometer; and
   an inertia ring connected to the periphery of the flexural disk, the inertia ring having a plurality of peripheral slots therein for routing the first and second optical fiber leads from the first and second optical fiber coils, respectively, to the optical coupler, wherein the plurality of slots are arranged to accommodate mismatches in optical fiber lead lengths so that so that the inner and outer fiber leads from both the first and second fiber coils exit the coil assembly together and take the same path to the coupler to provide improved common mode rejection of extraneous environmentally-induced phase shifts.

3. A fiber optic displacement sensor, comprising:
   a support base;
   a mounting post extending from the base;
   a flexural disk connected to the mounting post, the flexural disk having a first side and a second side;
   a first spiral wound optical fiber coil formed on the first side of the flexural disk, the first coil having a first inner optical fiber lead and a first outer optical fiber lead extending therefrom;
   a second spiral wound optical fiber coil formed on the second side of the flexural disk, the second coil having a second inner optical fiber lead and a second outer optical fiber lead extending therefrom;
   an optical coupler arranged to couple optical signals between the first and second optical fiber coils to form an interferometer; and
   an inertia ring connected to the periphery of the flexural disk, the inertia ring having a plurality of peripheral slots therein for routing the first and second optical fiber leads from the first and second optical fiber coils, respectively, to the optical coupler; and
   a housing cover attached to the base such that the mounting post so that to first and second flexural disks and the optical coupler are contained within the housing cover, the base including an inwardly directed projection arranged to retain the first and second optical fiber loads in selected positions within the housing.

4. The fiber optic displacement sensor of claim 3, wherein the flexural disk includes a central passage therethrough, further comprising a bolt extending from the mounting post through the central passage in the flexural disk; and a nut engaged with the bolt to clamp the flexural disk independently from attachment of the housing cover to the base.

5. The fiber optic displacement sensor of claim 4, further comprising a hinge formed in the flexural disk adjacent the central passage to increase the sensitivity of the sensor.

6. The fiber optic displacement sensor of claim 4, further comprising an inner hinge formed in the flexural disk adjacent the central passage and a outer hinge formed in the flexural disk adjacent the outer periphery near the inertia ring to further to increase the sensitivity of the sensor and reduce any tendency to twist the ring.

7. The fiber optic displacement sensor of claim 4 wherein the housing cover includes a dome-shaped lid that is threadedly engaged with an end of the bolt.

8. A fiber optic displacement sensor, comprising:
   a support base;
   a mounting post extending from the base;
   a flexural disk connected to the mounting post, the flexural disk having a first side and a second side;
   a first spiral wound optical fiber coil formed on the first side of the flexural disk, the first coil having a first inner optical fiber lead and a first outer optical fiber lead extending therefrom;
   a second spiral wound optical fiber coil formed on the second side of the flexural disk, the second coil having a second inner optical fiber lead and a second outer optical fiber lead extending therefrom;

an optical coupler arranged to couple optical signals between the first and second optical fiber coils to form an interferometer;

an inertia ring connected to the periphery of the flexural disk, the inertia ring having a plurality of peripheral slots therein for routing the first and second optical fiber leads from the first and second optical fiber coils, respectively, to the optical coupler; and wherein the support base includes a pair of parallel passages extending therethrough generally perpendicular to the mounting post and wherein each of the passages has an optical coupler mounted therein, the optical couplers being connected to the optical fiber coils to form a Mach-Zehnder interferometer.

9. A fiber optic displacement sensor, comprising:

a support base;

a mounting post extending from the base;

a flexural disk connected to the mounting post, the flexural disk having a first side and a second side;

a first spiral wound optical fiber coil formed on the first side of the flexural disk, the first coil having a first inner optical fiber lead and a first outer optical fiber lead extending therefrom;

a second spiral wound optical fiber coil formed on the second side of the flexural disk, the second coil having a second inner optical fiber lead and a second outer optical fiber lead extending therefrom;

an optical coupler arranged to couple optical signals between the first and second optical fiber coils to form an interferometer;

an inertia ring connected to the periphery of the flexural disk, the inertia ring having a plurality of peripheral slots therein for routing the first and second optical fiber leads from the first and second optical fiber coils, respectively, to the optical coupler; and the flexural disk having a first curved groove formed in the first side thereof and a second curved groove formed in the second side thereof, the first and second curved grooves being arranged to provide paths for the first and second inner optical fiber leads to be routed under the first and second optical fiber coils, respectively.

10. The fiber optic displacement sensor of claim 9 wherein the first curved groove is formed to allow the first inner optical fiber lead to emerge from under the first optical fiber coil in a direction tangential thereto such that the first inner optical fiber lead may be spiral wound on both inner and outer portions of the inertia ring without having a bend radius that is less than a predetermined minimum.

* * * * *